US012416300B2

(12) United States Patent
Moss et al.

(10) Patent No.: US 12,416,300 B2
(45) Date of Patent: Sep. 16, 2025

(54) INFLATOR HAVING AN OUTLET ROTATABLE RELATIVE TO A HANDLE

(71) Applicant: Black & Decker Inc., New Britain, CT (US)

(72) Inventors: Darren B. Moss, York, PA (US); Ashok Samuel Baskar, Glen Arm, MD (US); Oleksiy P. Sergyeyenko, Baldwin, MD (US); Tyler M. Knight, Ellicott City, MD (US)

(73) Assignee: BLACK & DECKER INC., New Britain, CT (US)

( * ) Notice: Subject to any disclaimer, the term of this patent is extended or adjusted under 35 U.S.C. 154(b) by 641 days.

(21) Appl. No.: 17/543,934

(22) Filed: Dec. 7, 2021

(65) Prior Publication Data

US 2022/0186721 A1 Jun. 16, 2022

Related U.S. Application Data

(60) Provisional application No. 63/126,133, filed on Dec. 16, 2020.

(51) Int. Cl.

*F04B 39/12* (2006.01)
*B25F 3/00* (2006.01)
*B25F 5/02* (2006.01)

(52) U.S. Cl.

CPC ................ *F04B 39/12* (2013.01); *B25F 5/02* (2013.01); *B25F 3/00* (2013.01)

(58) Field of Classification Search

CPC .... B25F 5/027; B25F 5/02; B25F 3/00; F05D 2230/52; F04B 39/12; F04B 39/14; F04B 35/04; F04D 25/0673; F04D 25/084; F04D 29/62

USPC ............................................ 173/29; 417/234

See application file for complete search history.

(56) References Cited

U.S. PATENT DOCUMENTS 2,073,014 A 3/1937 Jennings
2,160,278 A 5/1939 William et al.
3,099,386 A * 7/1963 Pieper .................. F04D 25/084 126/25 B
3,441,201 A 4/1969 Hollenberg
3,647,323 A * 3/1972 Thomas .................. H02K 7/14 415/206

(Continued)

FOREIGN PATENT DOCUMENTS

AU 2018200068 A1 * 7/2018 .......... A47C 27/082
CN 106704143 A 5/2017

(Continued)

OTHER PUBLICATIONS

EP EESR dated, Jun. 22, 2022 in corresponding EP application No. 21214191.5.

*Primary Examiner* — Mark A Laurenzi
*Assistant Examiner* — Benjamin Doyle
(74) *Attorney, Agent, or Firm* — Stephen R. Valancius

(57) ABSTRACT

An inflator includes a housing, a handle formed by the housing, a motor housed in the housing, a trigger configured to activate the motor, an inlet having an inlet axis that is generally parallel or concentric with a longitudinal axis of the motor, an outlet which is transverse to the inlet and a fan configured to draw air in through the inlet and blow air out through the outlet. The inlet is generally transverse to the handle.

The position of the outlet is rotatable relative to the handle.

11 Claims, 18 Drawing Sheets

(56) References Cited

U.S. PATENT DOCUMENTS

| | | | | |
|---|---|---|---|---|
| 3,809,504 | A * | 5/1974 | Goossens | F04D 25/084 415/206 |
| 4,021,150 | A * | 5/1977 | Mabuchi | F04D 13/068 415/121.2 |
| 4,287,795 | A * | 9/1981 | Curtiss | B25B 21/002 81/57.3 |
| 4,413,371 | A * | 11/1983 | Tuggle | A47L 5/14 15/328 |
| 4,466,780 | A | 8/1984 | Naurath | |
| 4,516,561 | A * | 5/1985 | Stawski | F04D 25/08 126/25 B |
| 4,678,014 | A | 7/1987 | Owen et al. | |
| 4,884,314 | A * | 12/1989 | Miner | A01G 20/47 15/419 |
| D391,969 | S | 3/1998 | Poon | |
| 5,848,875 | A | 12/1998 | San-Jou | |
| 5,879,141 | A | 3/1999 | Yokozawa et al. | |
| 5,890,882 | A * | 4/1999 | Feldman | F04D 25/0673 5/713 |
| 5,938,410 | A * | 8/1999 | Lee | A47L 5/24 417/423.2 |
| D415,500 | S | 10/1999 | Poon | |
| D422,602 | S | 4/2000 | Poon | |
| 6,045,341 | A * | 4/2000 | Mak | A63H 33/40 446/179 |
| 6,119,738 | A * | 9/2000 | Idol | F04D 25/084 239/525 |
| 6,155,781 | A | 12/2000 | Tsai | |
| 6,290,469 | B1 | 9/2001 | Archibald | |
| 6,295,693 | B1 * | 10/2001 | Chou | F04D 29/626 141/66 |
| D451,521 | S | 12/2001 | Poon | |
| 6,468,047 | B1 | 10/2002 | Huang et al. | |
| D466,908 | S | 12/2002 | Poon | |
| D467,941 | S | 12/2002 | Duncan | |
| D467,942 | S | 12/2002 | Duncan | |
| D470,863 | S | 2/2003 | Williams | |
| D486,159 | S | 2/2004 | Poon | |
| 7,210,902 | B2 * | 5/2007 | Song | F04D 29/503 415/206 |
| 8,210,834 | B2 | 7/2012 | Tsai | |
| 8,613,605 | B2 | 12/2013 | Hammar et al. | |
| 8,672,650 | B2 | 3/2014 | Horng et al. | |
| 8,702,403 | B2 | 4/2014 | Horng et al. | |
| 8,721,298 | B2 * | 5/2014 | Tanimoto | F04D 25/0653 417/234 |
| 8,974,194 | B2 | 3/2015 | Yin et al. | |
| 8,974,195 | B2 | 3/2015 | Horng et al. | |
| 9,239,060 | B2 | 1/2016 | Heymann | |
| 9,291,170 | B2 | 3/2016 | Heymann | |
| 9,371,828 | B2 * | 6/2016 | Tsai | F04D 27/008 |
| 9,388,826 | B2 | 7/2016 | Liu et al. | |
| D771,713 | S | 11/2016 | Ye et al. | |
| 9,655,278 | B2 | 5/2017 | Wu | |
| 9,702,367 | B2 | 7/2017 | Wu | |
| 9,707,580 | B1 * | 7/2017 | Mancl | H02P 25/14 |
| 9,883,634 | B2 * | 2/2018 | Romito | A01G 20/47 |
| D817,364 | S | 5/2018 | He | |
| D840,437 | S | 2/2019 | Blaser | |
| D841,696 | S | 2/2019 | Blaser | |
| D868,119 | S | 11/2019 | Kobler et al. | |
| D869,507 | S | 12/2019 | Huang et al. | |
| D869,508 | S | 12/2019 | Huang et al. | |
| 2005/0042051 | A1 | 2/2005 | Obermeier et al. | |
| 2006/0073040 | A1 | 4/2006 | Metzger et al. | |
| 2008/0226476 | A1 * | 9/2008 | Lau | F04D 25/084 417/411 |
| 2008/0286124 | A1 | 11/2008 | Sen et al. | |
| 2010/0170538 | A1 * | 7/2010 | Baker | B08B 5/04 409/137 |
| 2013/0020106 | A1 | 1/2013 | Kuehne et al. | |
| 2014/0064943 | A1 * | 3/2014 | Wang | F04B 39/121 415/182.1 |
| 2014/0332243 | A1 * | 11/2014 | Baskar | B25F 5/02 173/29 |
| 2018/0187687 | A1 * | 7/2018 | Yakubova | F04D 25/08 |
| 2019/0105458 | A1 * | 4/2019 | Hammes | A61L 9/122 |
| 2019/0290080 | A1 * | 9/2019 | Liu | B08B 5/02 |
| 2021/0340991 | A1 * | 11/2021 | Ojima | F04D 25/0606 |

FOREIGN PATENT DOCUMENTS

| | | | | |
|---|---|---|---|---|
| CN | 207268209 | U | 4/2018 | |
| CN | 210317647 | U | 4/2020 | |
| CN | 211009180 | U | 7/2020 | |
| DE | 20100015 | U1 * | 6/2001 | F04B 35/04 |
| DE | 202012100512 | U1 | 3/2012 | |
| DE | 102012211038 | A1 | 1/2014 | |
| EP | 3346126 | A1 | 7/2018 | |
| IN | 207223899 | U | 4/2018 | |
| NO | 2014161257 | A1 | 10/2014 | |

* cited by examiner

INFLATOR HAVING AN OUTLET ROTATABLE RELATIVE TO A HANDLE

This application claims the benefit of U.S. Provisional Application No. 63/126,133 filed on Dec. 16, 2020, entitled High Volume, Low Pressure Inflator. The entire contents of which are incorporated herein by reference.

BACKGROUND OF THE INVENTION

The present disclosure relates to an inflator. In particular, exemplary embodiments disclose a high flow, low pressure inflator.

SUMMARY OF EMBODIMENTS OF THE INVENTION

Aspects of the present disclosure relate to an exemplary embodiment of an inflator power tool.

According to one aspect, there is an exemplary embodiment of a high-volume, low pressure inflator that includes a housing; a handle formed by the housing; a motor housed in the housing; a trigger configured to activate the motor; an inlet having an inlet axis that is generally parallel or concentric with a longitudinal axis of the motor; an outlet which is transverse to the inlet; a fan configured to draw air in through the inlet and blow air out through the outlet.

The inlet may be generally transverse to the handle.

The position of the outlet may be rotatable relative to the handle.

The outlet may be rotatable about a rotation axis.

The rotation axis may be generally concentric or parallel to the longitudinal axis of the motor.

The rotation axis may be generally transverse to the handle.

According to another aspect, there is an exemplary embodiment of an inflator, the inflator including a tool base unit, the tool base unit comprising a handle, a motor and a trigger; and an inflator tool head removably attached to the tool base unit.

The inflator tool head may include an air inlet, an air outlet and a fan configured to draw air in through the air inlet and blow air out through the air outlet.

The inlet may be transverse to the outlet.

The outlet may be rotatable with respect to the tool base unit while the inflator tool head is attached to the tool base unit.

The inlet may be generally transverse to the handle.

The inflator may further include an attachment holder configured to hold an inflator attachment.

The attachment holder may be disposed on the inflator tool head.

The inflator tool head may include a connection portion and a fan housing portion.

The fan may be disposed in the fan housing portion.

The fan housing portion may be rotatable with respect to the connection portion.

The fan housing portion may include the air outlet.

The fan housing portion may include the air inlet.

The fan housing portion may be configured to be held in place in a variety of rotational positions with respect to the connection portion.

The fan housing portion may be configured to be held in place by friction.

The fan housing portion may be configured to be held in place by a biasing assembly.

The fan housing portion may be configured to be held in place at plurality of distinct rotational positions.

The plurality of distinct rotational positions may include at least four distinct rotational positions.

The connection portion may house a connector which receives drive from the motor.

According to another aspect, there is an exemplary embodiment of a high-volume, low pressure inflator, the inflator including a housing; a handle formed by the housing; a motor housed in the housing; a trigger configured to activate the motor; an inflator head portion; an inlet having an inlet axis that is generally parallel or concentric with a longitudinal axis of the motor; an outlet which is transverse to the inlet; a fan configured to draw air in through the inlet and blow air out through the outlet.

The inlet may be generally transverse to the handle.

The position of the outlet may be rotatable relative to the handle.

The inflator head portion may include a connection portion and a fan housing portion.

The fan may be disposed in the fan housing portion.

The fan housing portion may include the outlet and is rotatable with respect to the connection portion.

The outlet may be rotatable about a rotation axis.

The rotation axis may be generally concentric or parallel to the longitudinal axis of the motor.

The rotation axis may be generally transverse to the handle.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
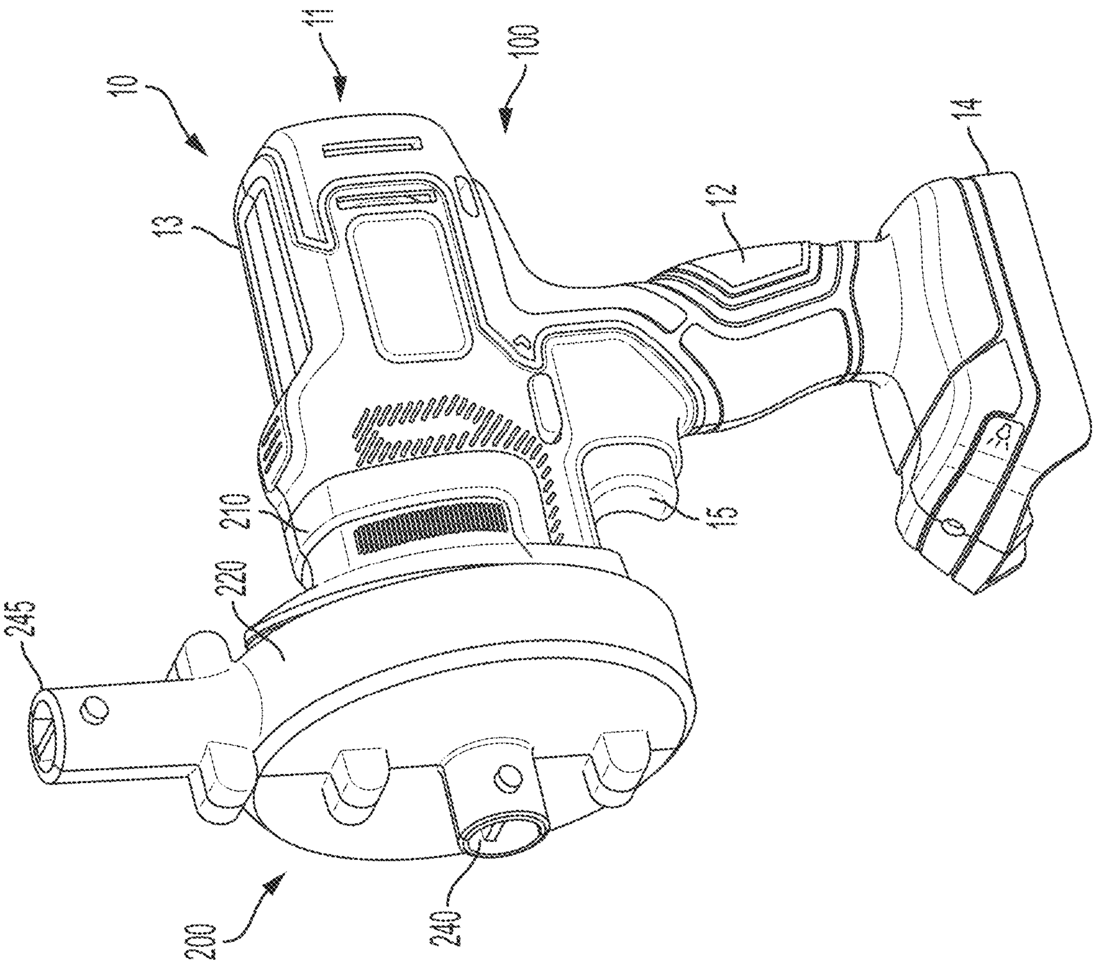
FIG. 1 is a perspective view of an inflator according to a first exemplary embodiment of the present application.

FIG. 1 illustrates a first exemplary embodiment of inflator 10. The inflator 10 of the exemplary embodiment is a high volume, low pressure inflator of that provides a high volume of airflow for inflating air mattresses, rafts and other inflatable items. As shown in FIG. 1, the inflator 10 includes a housing 11. The housing 11 forms a handle 12 and a motor housing portion 13. A motor is housed in the motor housing portion 13. There may be a transmission connected to the motor. The housing 11 also has a battery receiving portion 14 configured to receive a battery pack. In this case, the battery pack may be a power tool battery pack configured to power a variety of power tools such as drills, sanders and saws. The battery pack may be of the type shown in, for example, U.S. Pat. Nos. 7,598,705; 7,661,486; or U.S. Patent Application Publication No. 2018/0331335. U.S. Pat. Nos. 7,598,705; 7,661,486; and U.S. Patent Application Publication No. 2018/0331335 are hereby incorporated by reference. The battery pack powers the inflator 10 and particularly the motor of the inflator 10. A user-actuatable trigger 15 is housed in the handle 12. The trigger 15 can be actuated to actuate the motor.

Figure 2:
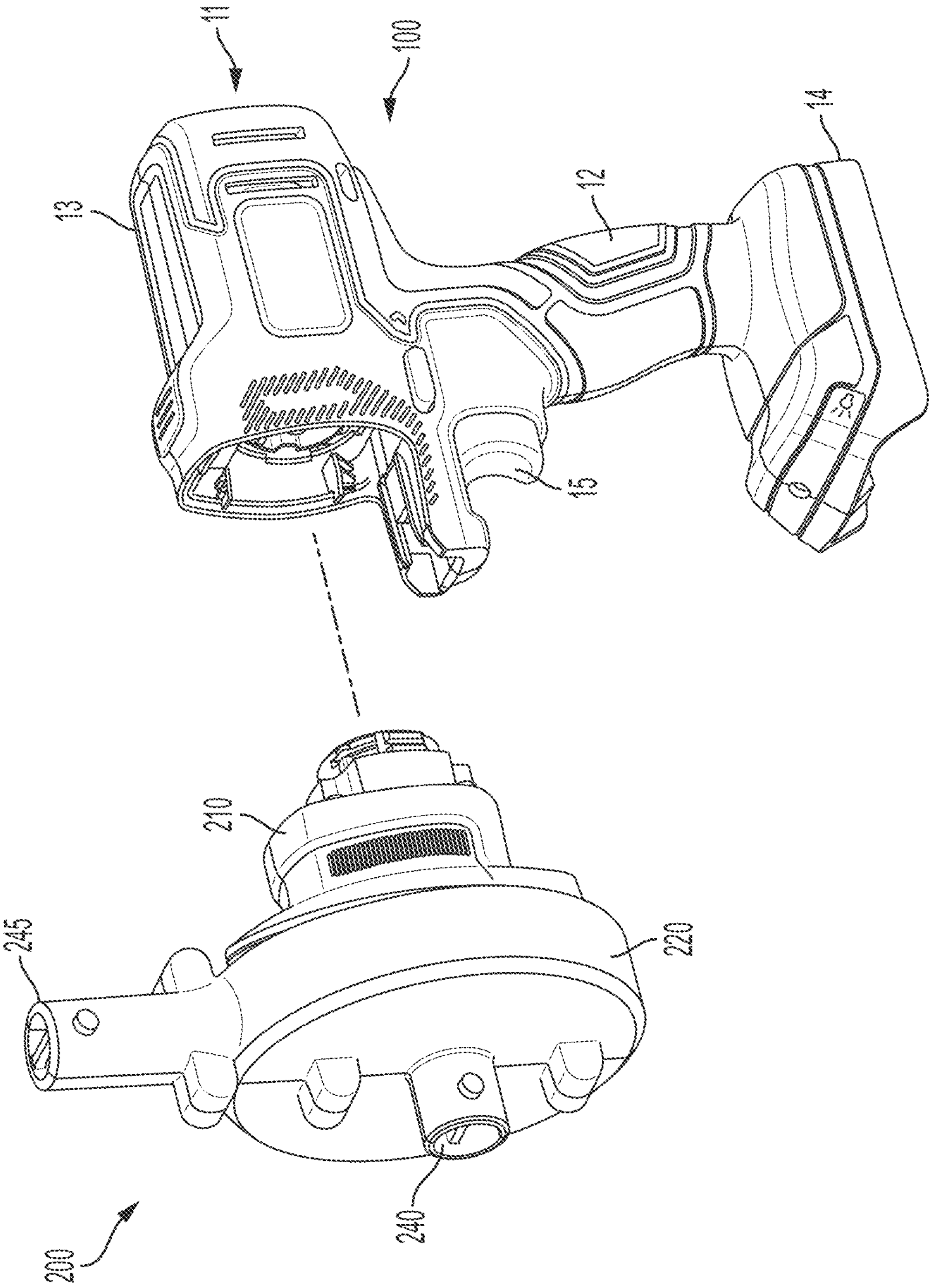
FIG. 2 is a perspective view of the exemplary embodiment of the inflator with the inflator tool head removed from the tool base unit.

The inflator 10 of the first exemplary embodiment includes a tool base unit 100 and an inflator tool head 200. As is shown in FIG. 2 of the present application, the inflator tool head 200 is removably attached to the tool base unit 100. Other tool heads such as a drill tool head, saw tool head, sander tool head and others may also be attached to the tool base unit 100 forming a multi-headed tool system. The tool base unit 100 may be of the same design as the tool base unit 100 show in U.S. Pat. No. 9,956,677, which is hereby incorporated by reference in its entirety and the tool base unit 100 of the present application may similarly accept the variety of tool heads as discussed in U.S. Pat. No. 9,956,677.

U.S. Pat. Nos. 9,421,682 and 9,776,315 are other examples of multi-headed tool systems. U.S. Pat. Nos. 9,421,682 and 9,776,315 are hereby incorporated by reference in their entireties.

Figure 18:
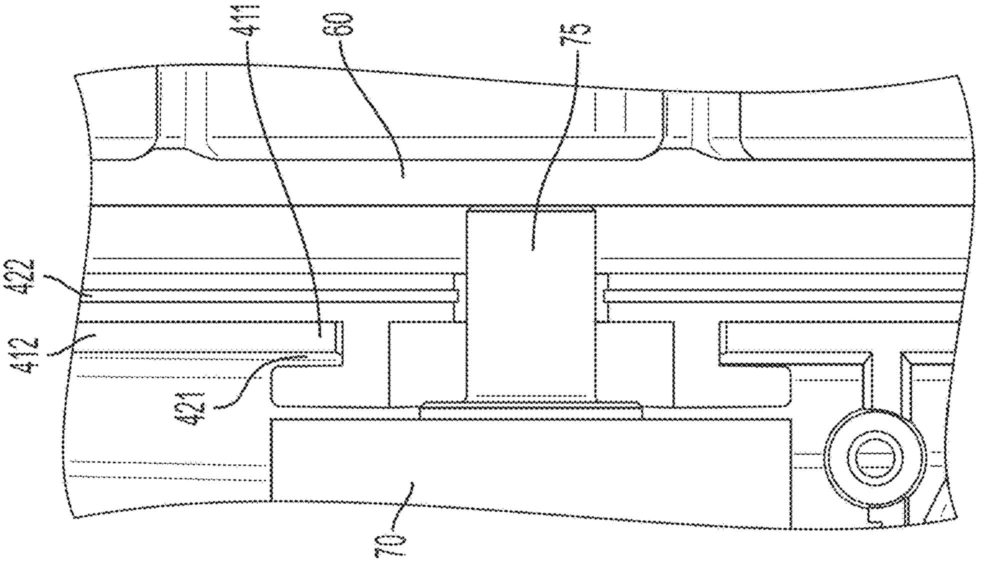
FIG. 18 is another close-up cut-away view of an inflator according to the third exemplary embodiment.
Figure 17:
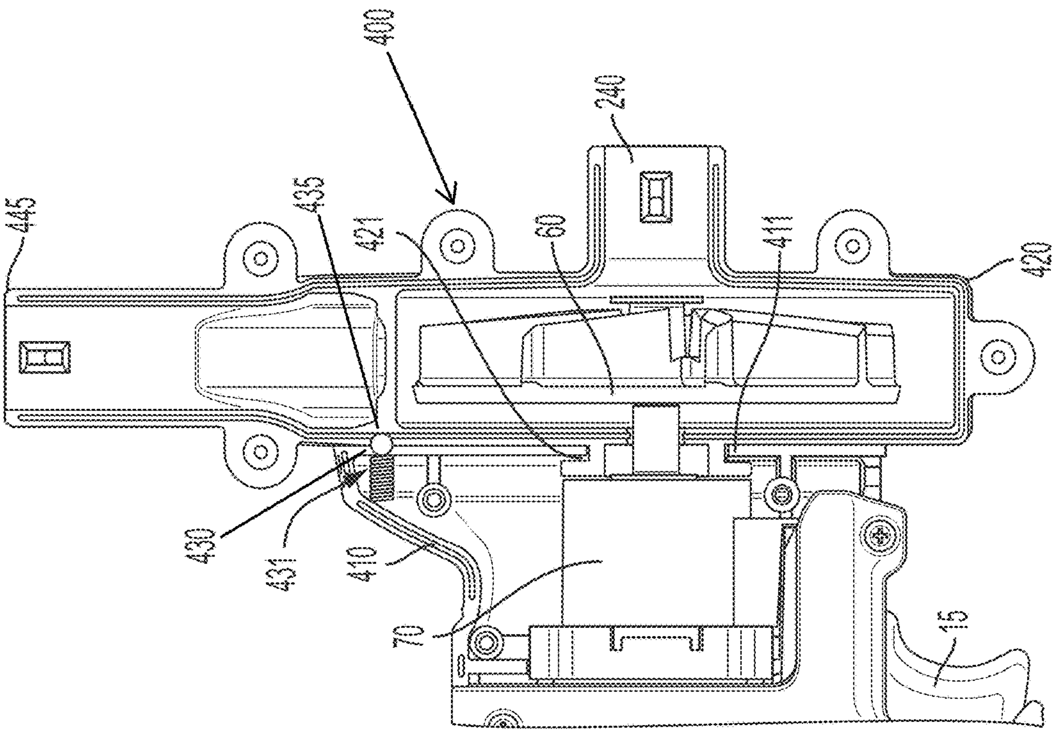
FIG. 17 is a close-up cut-away view of the inflator according to the third exemplary embodiment.

The inflator head portion 200 includes a connection portion 210. The connection portion is configured to connect to the tool base unit and transfer power from the motor of the tool base unit 100 to the tool head portion. The inflator head 200 further includes a fan housing portion 220 which houses a fan (fan 60 in FIGS. 17 and 18 is described further below). The fan draws air in through the inlet 240 and pushes air out through the air outlet 245. In this way, the inflator 10 can be used to inflate and deflate inflatable objects.

Figure 3:
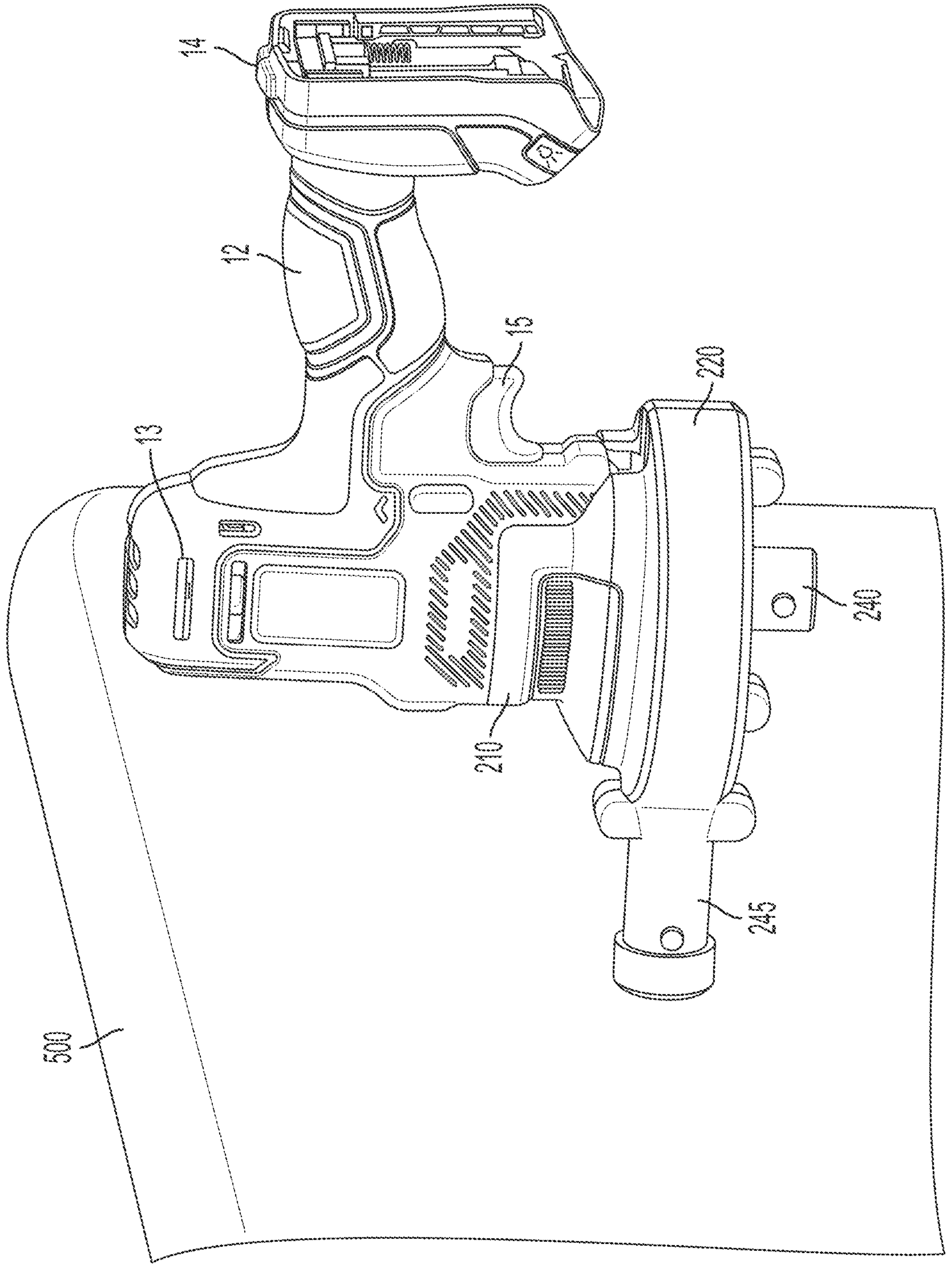
FIG. 3 is a perspective view of the inflator inflating a mattress.
Figure 4:
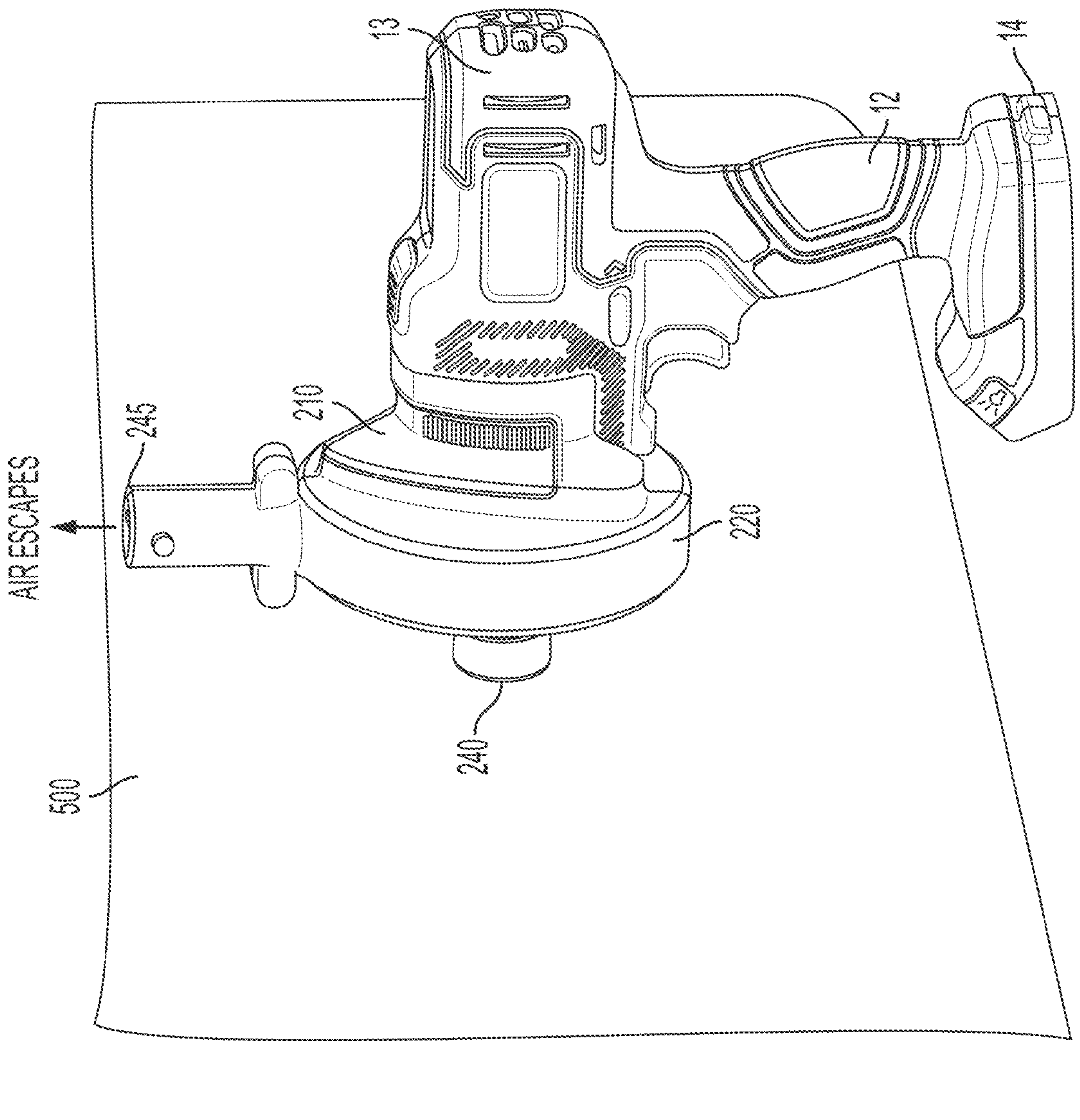
FIG. 4 is a perspective view of the inflator deflating the mattress.

FIGS. 3 and 4 show an example of the inflator 10 inflating and deflating a mattress 500. In FIG. 3, the air outlet 245 is engaged with the mattress 500 and the air inlet 240 is directed towards ambient air. In this position, air is drawn in through the air inlet 240 and directed through the air outlet 245 to the mattress 500.

FIG. 4 shows the inflator 10 in a position to deflate the mattress 500. In FIG. 4, the air inlet 240 is engaged with the mattress 500. The air outlet 245 is directed to ambient atmosphere. Accordingly, the inflator 10 draws air in from the mattress 500 through the air inlet 240 and blows it out of the air outlet 245. In this way, it deflates the mattress 500. Although the inflator 10 is shown inflating and deflating a mattress 500 in FIGS. 3 and 4, it is understood that the inflator 10 may similarly be used to inflate or deflate a variety of other inflatable products such as rafts, inter-tubes, beach balls and the like.

Figure 6:
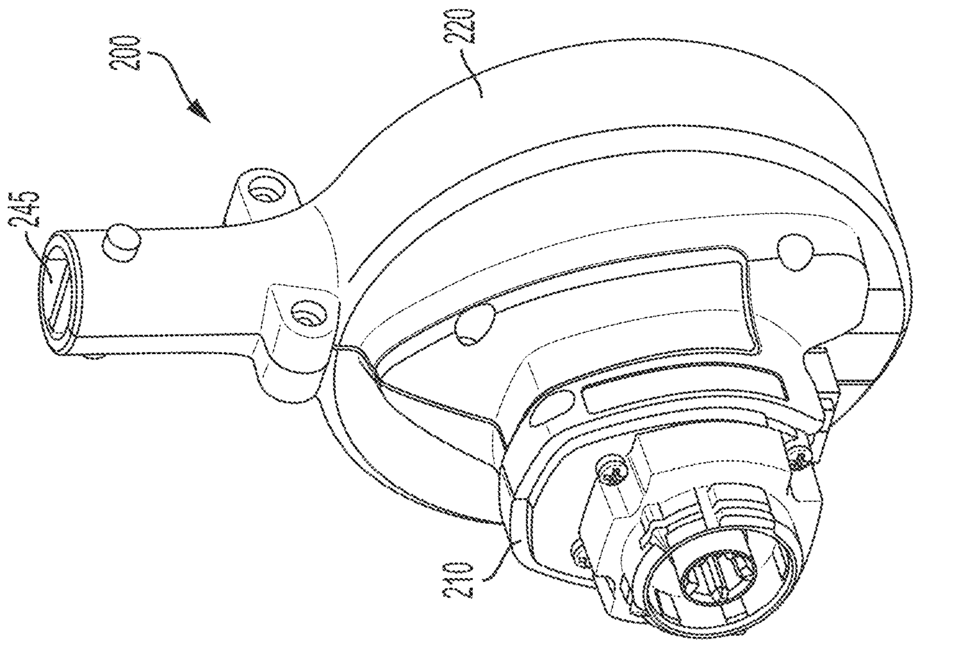
FIG. 6 is another perspective view the inflator tool head of the exemplary embodiment of the inflator.
Figure 5:
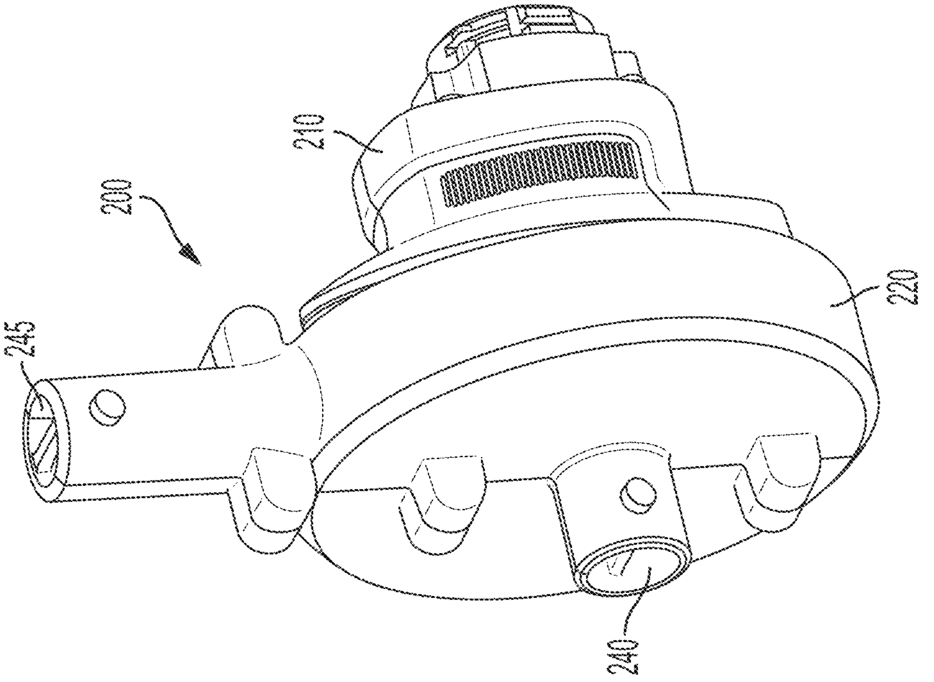
FIG. 5 is a perspective view the inflator tool head of the exemplary embodiment of the inflator.

FIGS. 5 and 6 illustrate the inflator head 200 alone. FIG. 6 illustrates a portion of the connection section 210 that interfaces with the tool base unit 100. As shown, the connection section 210 includes an intermediate input member 215 which receives a rotary drive from the motor. In particular, the intermediate input member 215 engages with an intermediate output member which is driven by the motor. In this way, rotary drive from the motor in the tool base unit 100 is transferred to the inflator tool head 200.

As shown in FIGS. 1-6, the air inlet 240 has an inlet axis that is generally parallel or concentric with a longitudinal axis of the motor. The air outlet 245 is transverse to the air inlet 240. Additionally, the air inlet 240 is generally transverse to the handle 12.

FIGS. 7-12 illustrate another exemplary embodiment of an inflator 101. The inflator 101 is the same as inflator 10 except with respect to the orientation of the air outlet 345. In particular, the tool base unit 100 is the same as in the inflator 10. Additionally, the inflator tool head 300 is the same as the inflator tool head 200, except that the air outlet 345 of the inflator tool head 300 is disposed to direct air sideways/horizontal as opposed to upwards/vertical.

Figure 7:
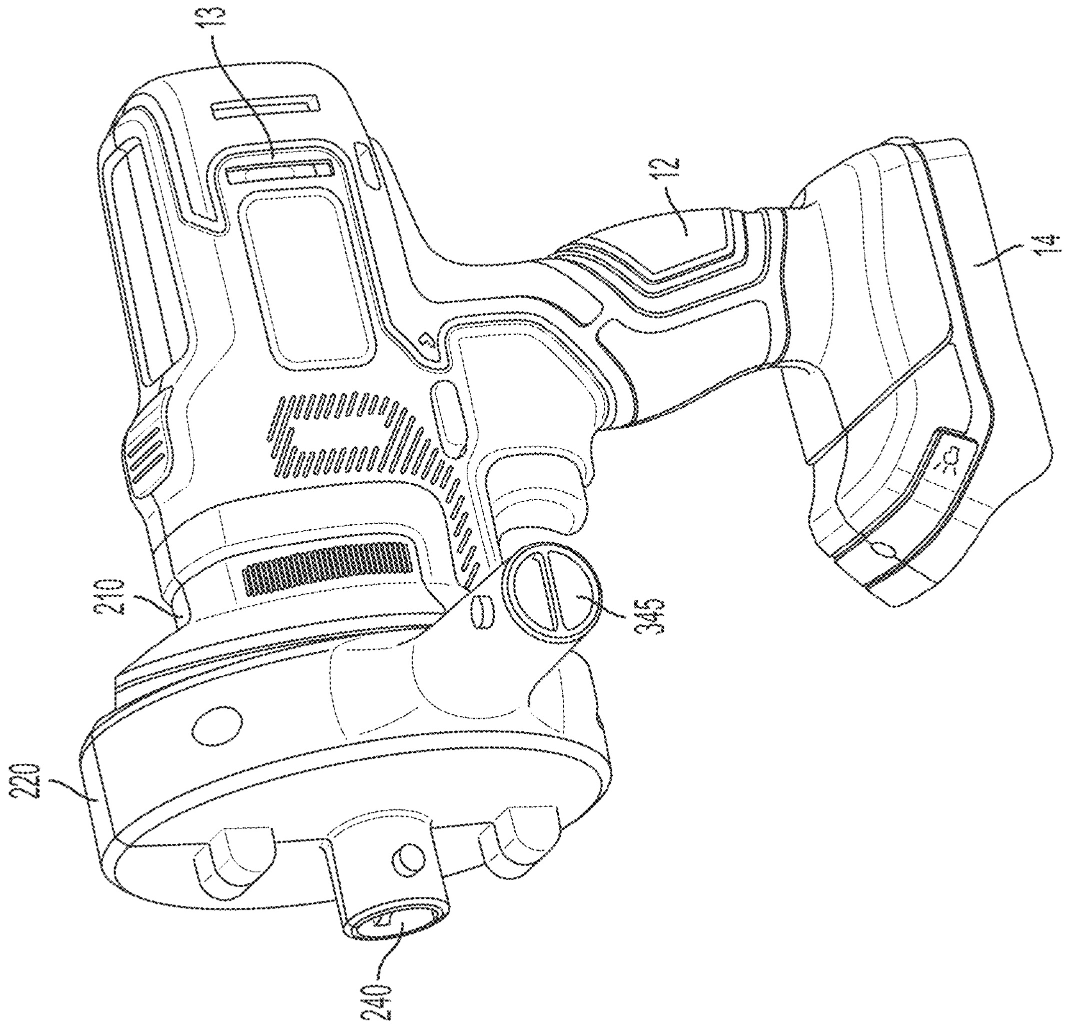
FIG. 7 is a perspective view of an inflator according to a second exemplary embodiment of the present application.

FIG. 7 illustrates the inflator 101 in the assembled condition with the inflator tool head 300 attached to the tool base unit 100. As shown in FIG. 7, when the tool head 300 is attached to the tool base unit 100, the air outlet 345 is directed to the side. That is, if the tool base unit 100 is placed on a horizontal surface, the air outlet 345 is generally to the side rather than up or down. Put another way, the air outlet 345 is generally transverse to the handle 12. The air outlet 345 is also generally transverse to a longitudinal axis of the motor. The motor produces a rotary drive along the longitudinal axis of the motor. The longitudinal axis of the motor is generally parallel or concentric with a longitudinal axis of the motor housing 13 and is generally transverse to the handle 12.

Figure 8:
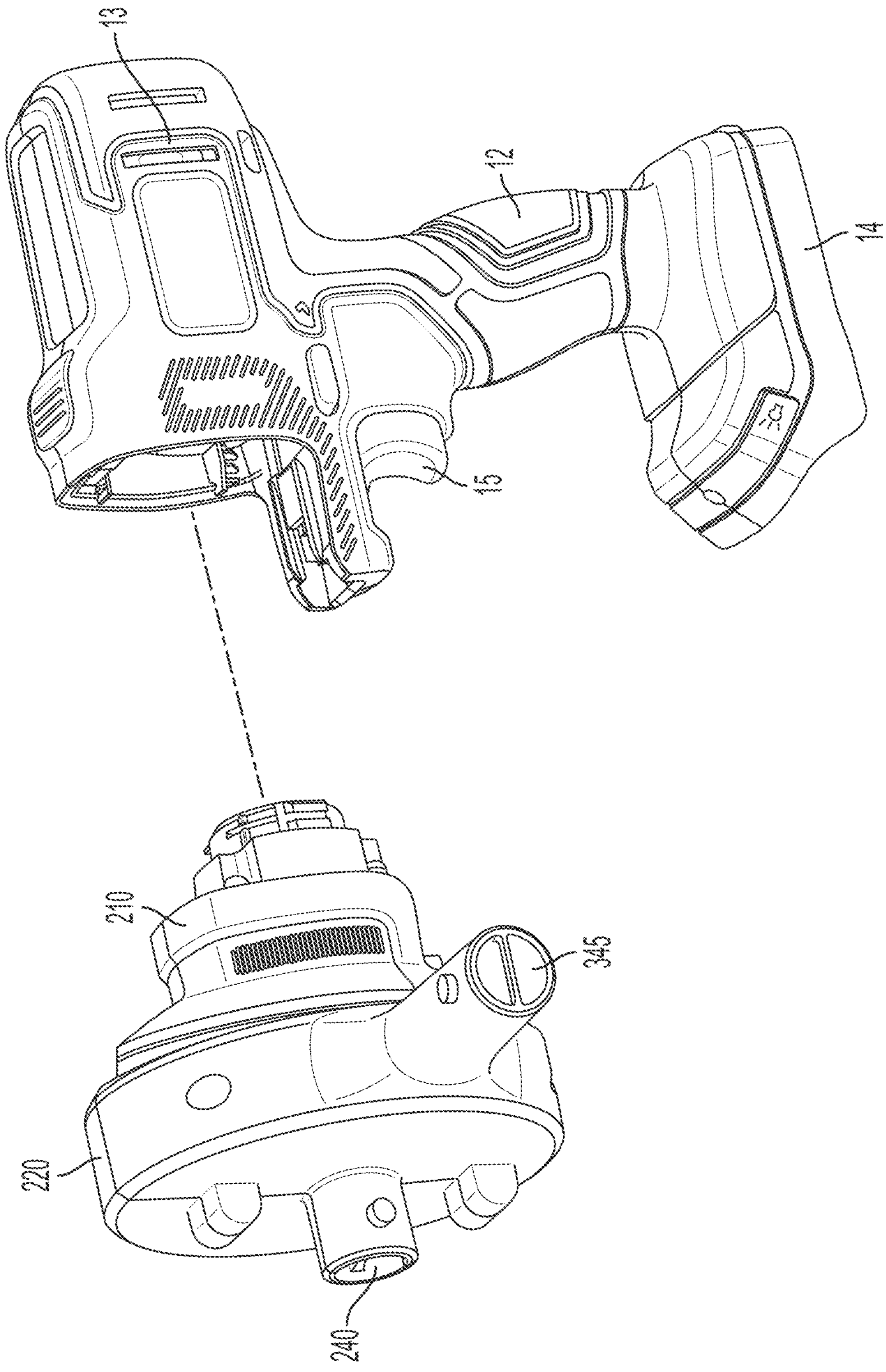
FIG. 8 is a perspective view of the second exemplary embodiment of the inflator with the inflator tool head removed from the tool base unit.
Figure 9:
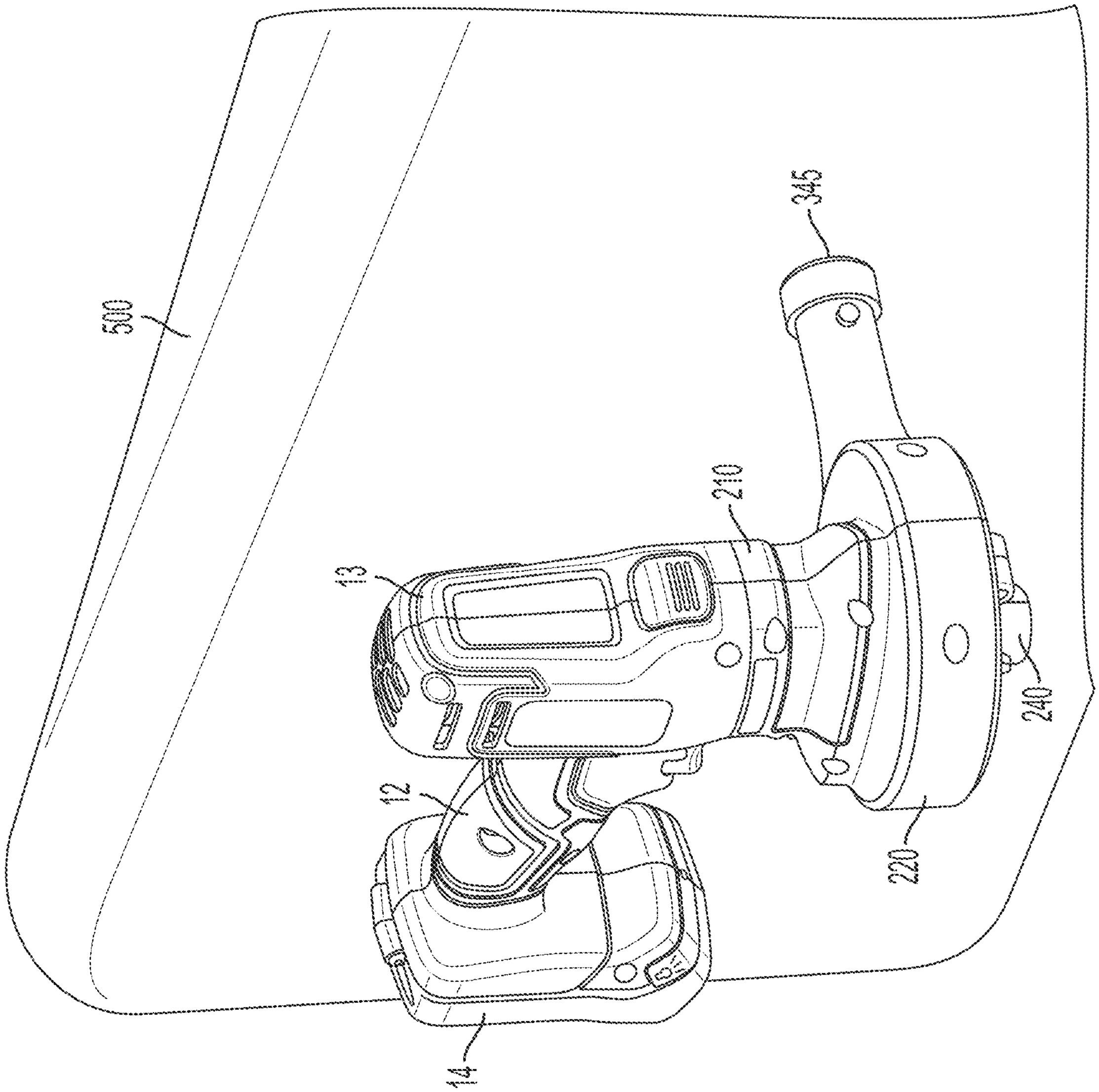
FIG. 9 is a perspective view of the second exemplary embodiment of the inflator inflating a mattress.
Figure 10:
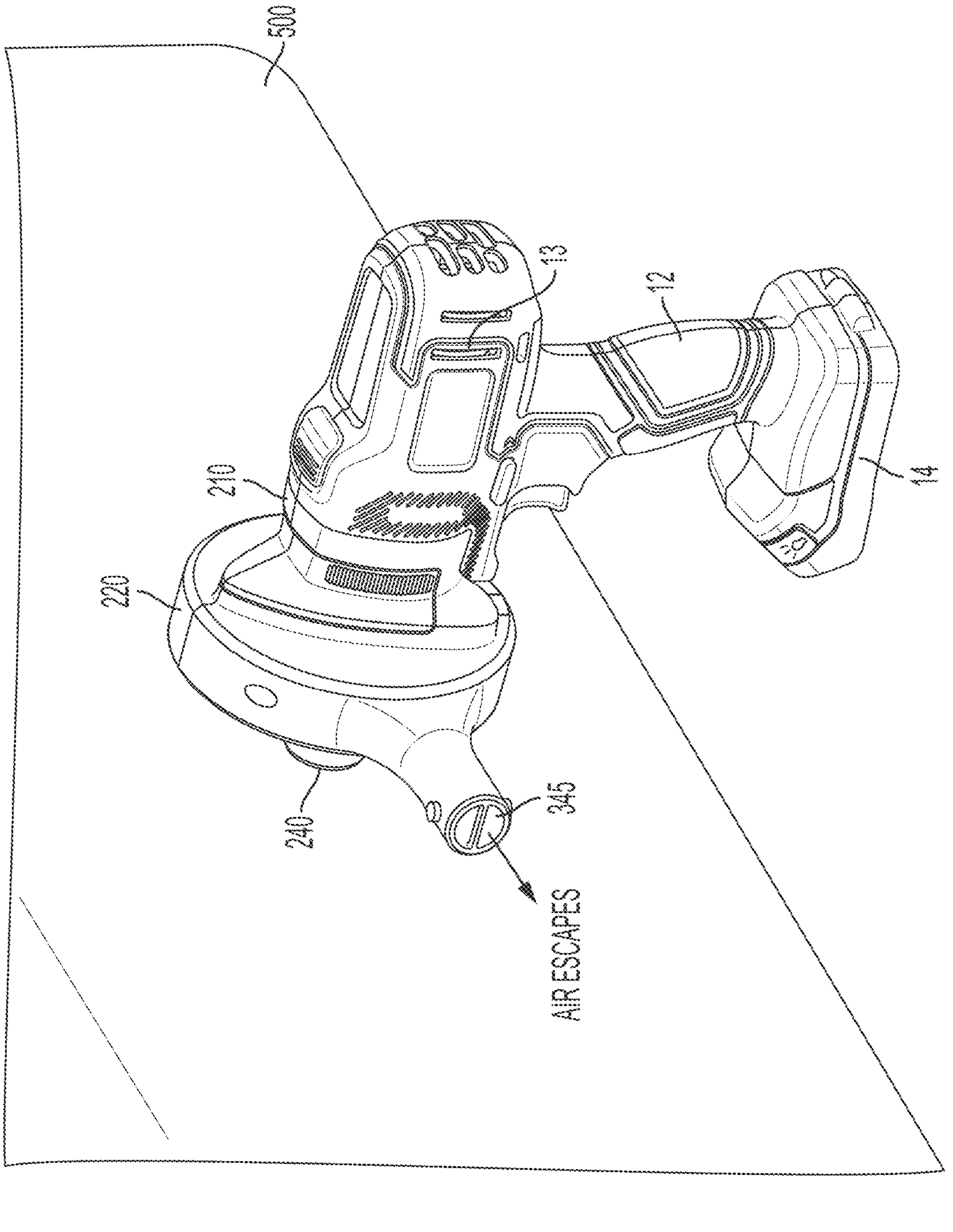
FIG. 10 is a perspective view of the inflator deflating the mattress.
Figure 11:
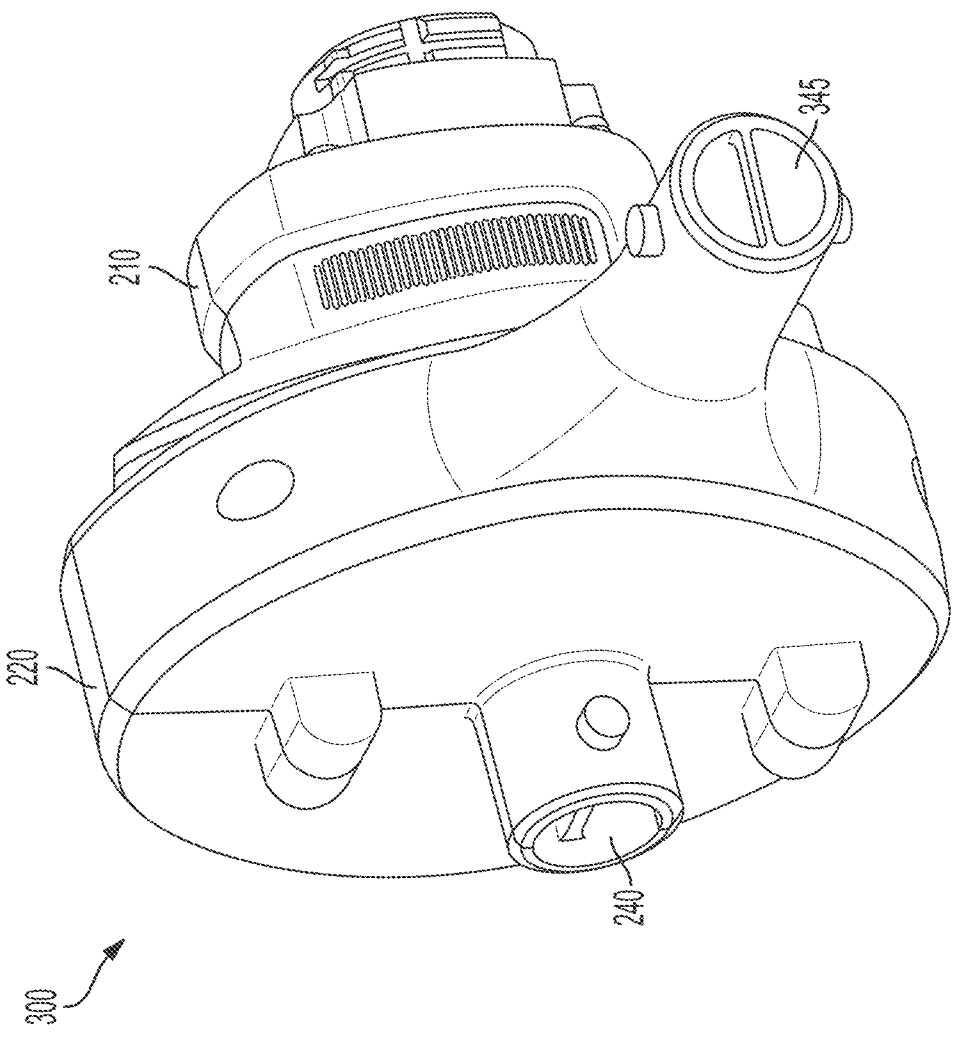
FIG. 11 is a perspective view the inflator tool head of the exemplary embodiment of the inflator.
Figure 12:
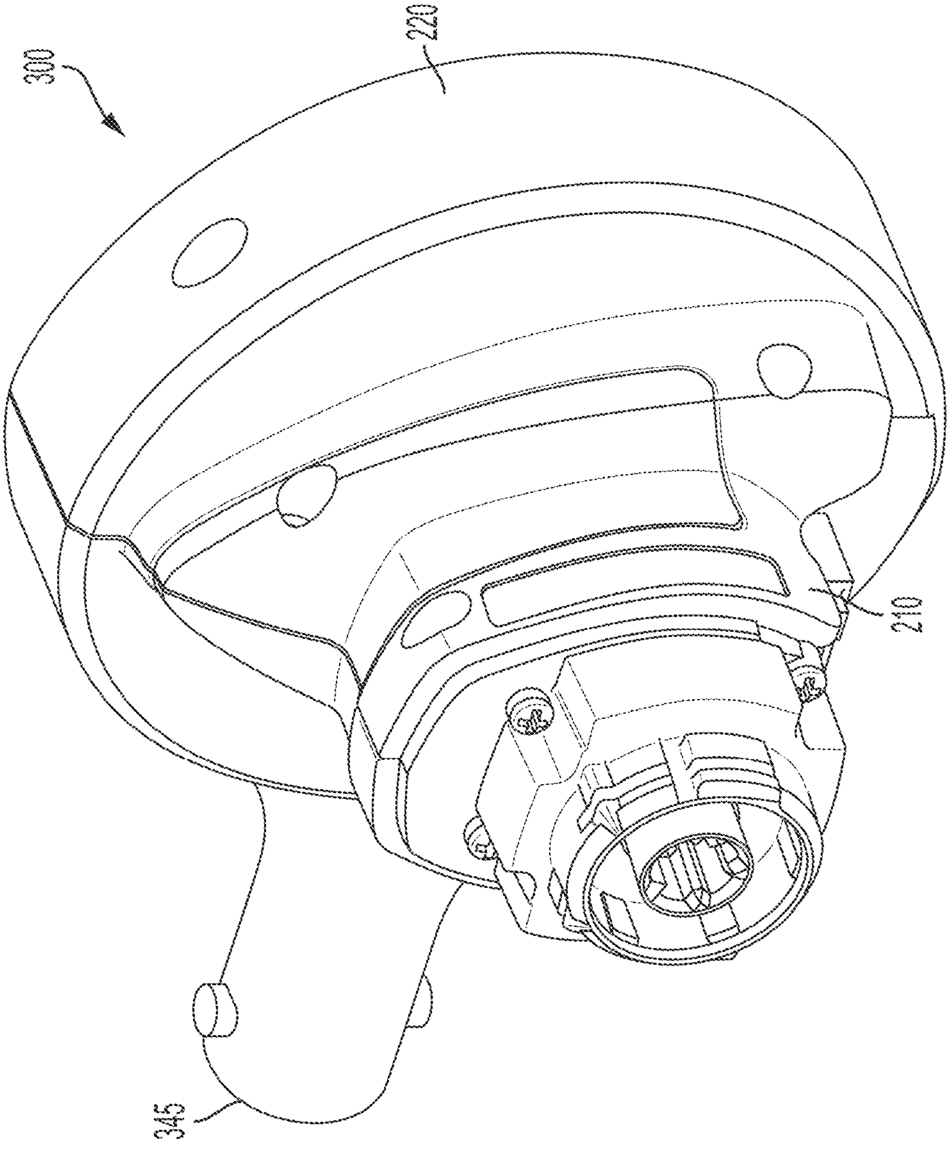
FIG. 12 is another perspective view the inflator tool head of the exemplary embodiment of the inflator.
Figure 13:
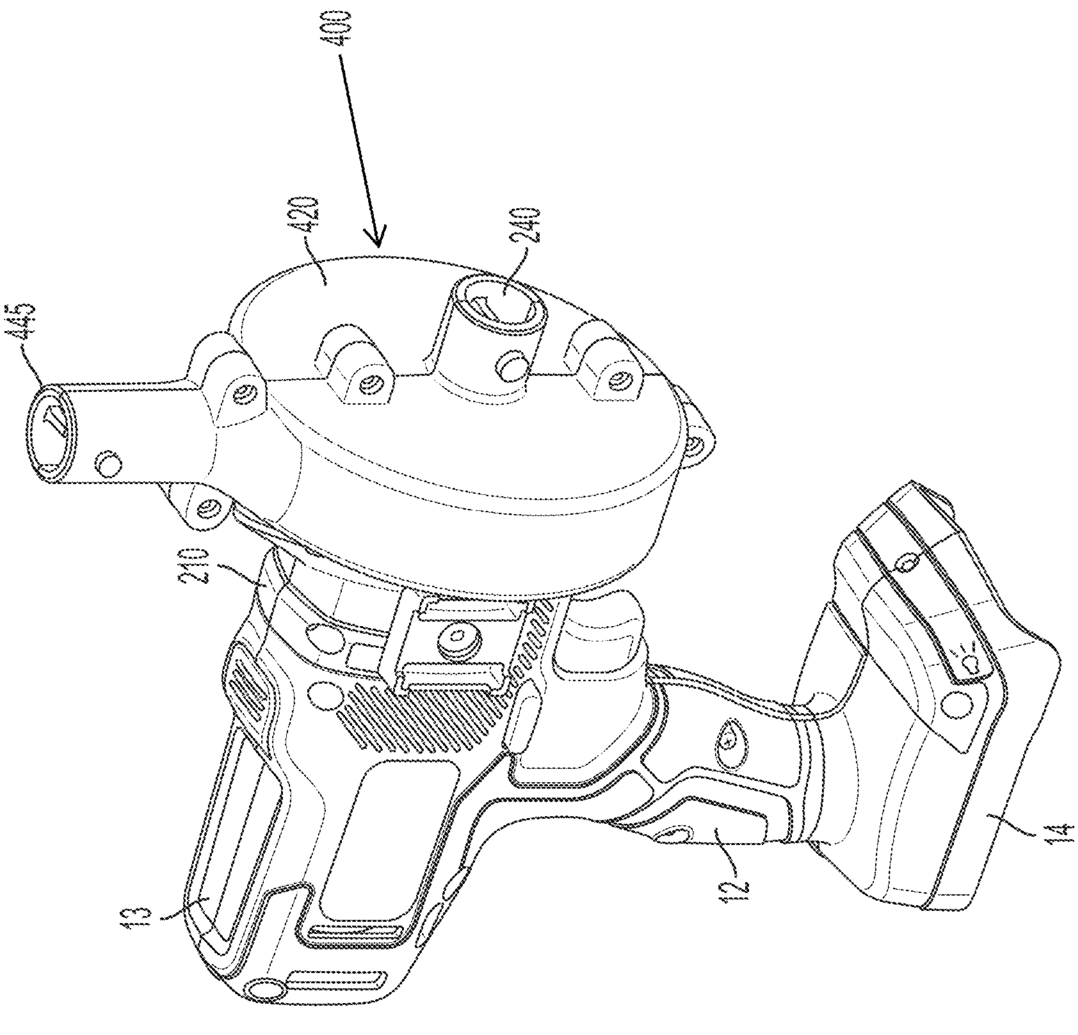
FIG. 13 is a perspective view of an inflator according to a third exemplary embodiment.

FIG. 8 illustrates the inflator 101 with the inflator tool head 300 removed. FIG. 9 illustrates the inflator 101 with the air outlet 345 engaged with the mattress 500 in order to inflate the mattress 500. FIG. 10 illustrates the inflator 101 with the air inlet 240 engaged with the mattress 500 in order to deflate the mattress 500. FIGS. 11 and 12 are views of the inflator tool head 300 by itself.

The first embodiment of the inflator 10 in FIGS. 1-6 illustrates the air outlet 245 in a first, upward, direction. The second embodiment of the inflator 101 in FIGS. 7-12 illustrates the air outlet 345 in a second, sideways, direction. The air outlet may also be radially located at various other directions. For example, the air outlet may be directed down instead of up. The air outlet 345 may be directed to the opposite side from that shown in FIGS. 7-12. Additionally, the air outlets 245, 345 may be directed at intermediate angled positions.

Figure 14:
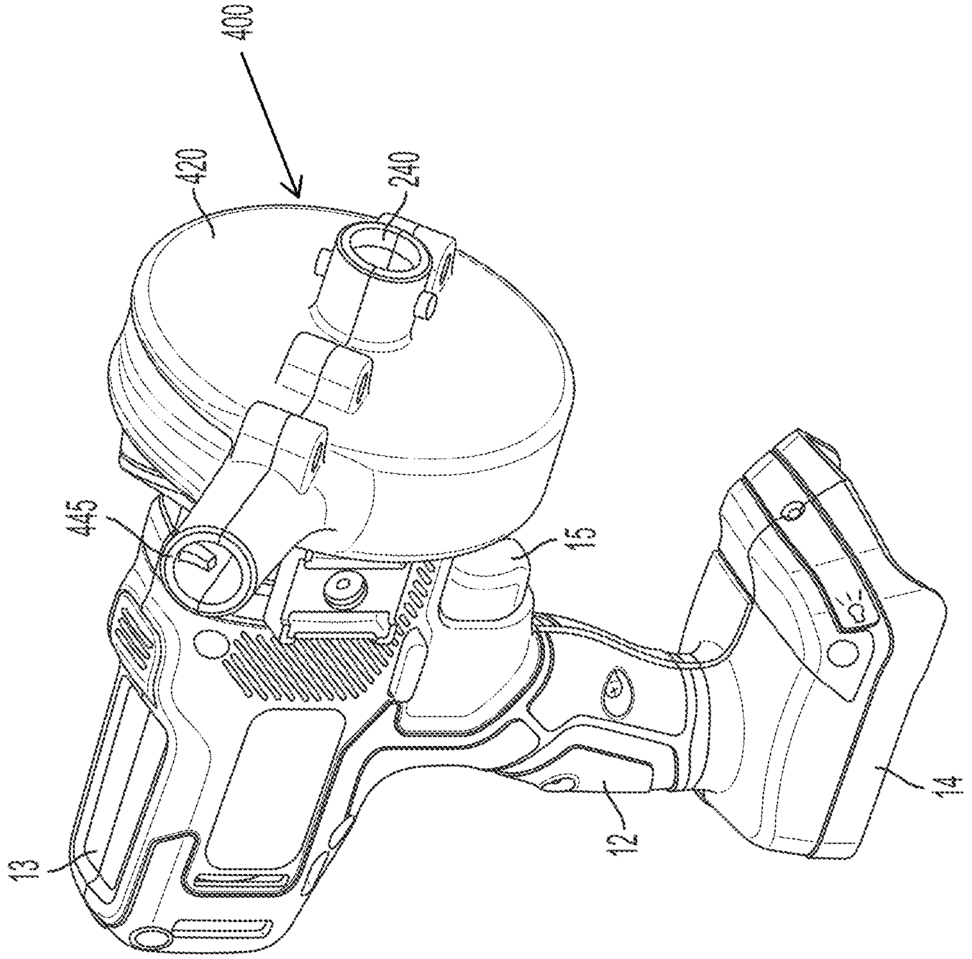
FIG. 14 is another perspective view of the inflator according to the third exemplary embodiment.
Figure 15:
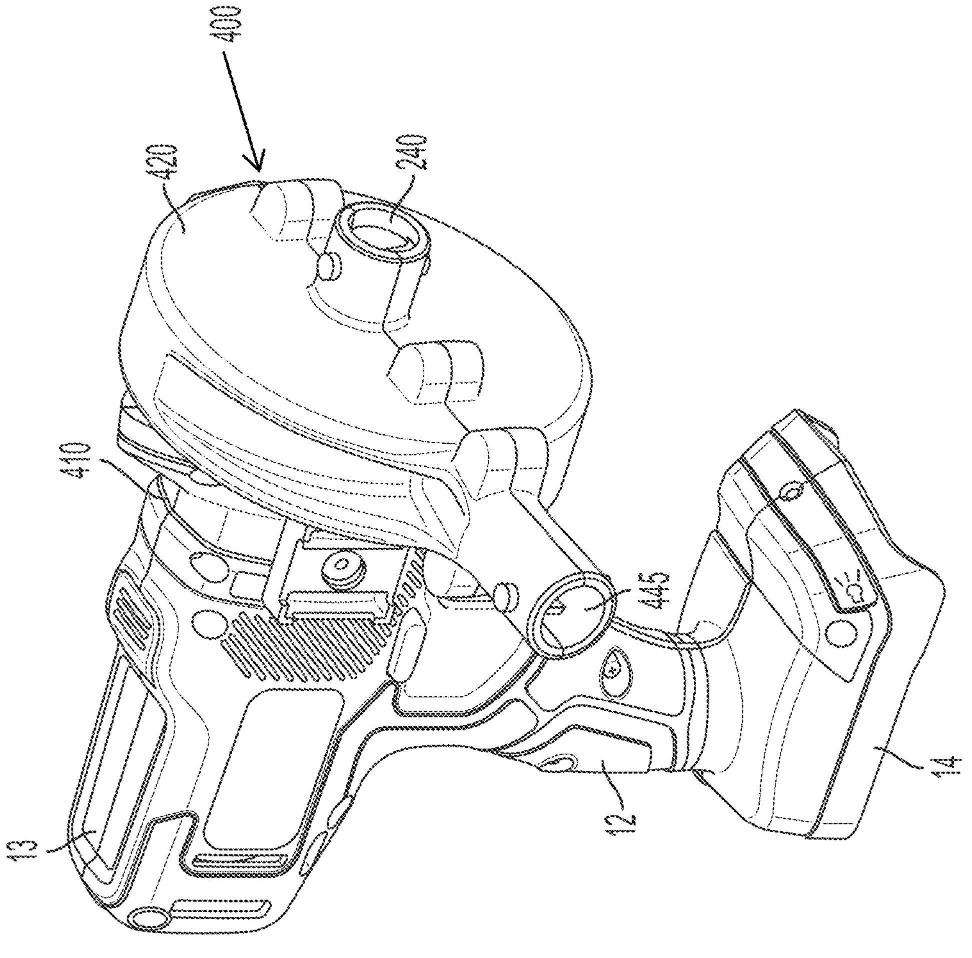
FIG. 15 is another perspective view of the inflator according to the third exemplary embodiment.
Figure 16:
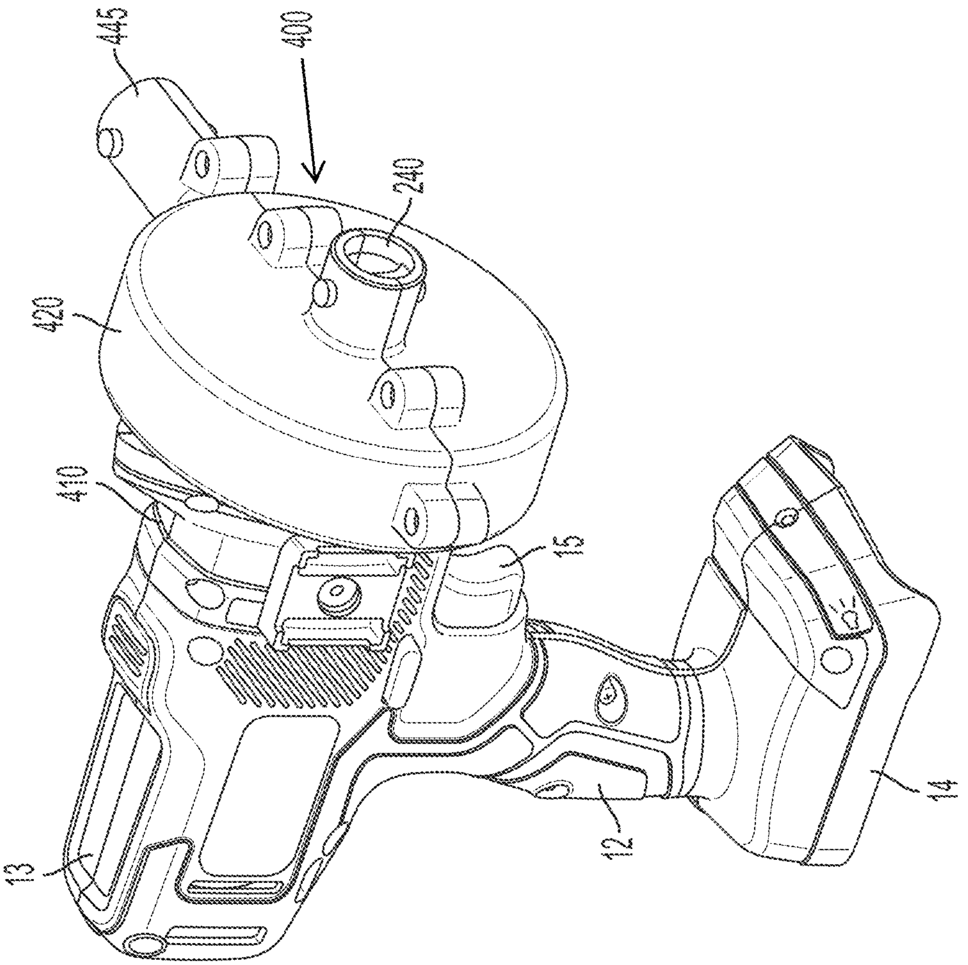
FIG. 16 is another perspective view of the inflator according to the third exemplary embodiment.

FIGS. 13-18 illustrate another exemplary embodiment of an inflator 102. Inflator 102 has the same base unit 100 as the inflators 10 and 101. Inflator 102 has an inflator tool head 400. The inflator tool head 400 is similar to the inflator tool heads 200 and 300. However, the inflator tool head 400 has a rotatable portion such that the air outlet 445 may be rotated 360 degrees to be pointed at various directions. For example, in FIG. 13, the outlet 445 is pointed straight up. In FIG. 14, the outlet 445 has been rotated to be at an angle between horizontal and vertical, roughly 45 degrees from horizontal or within a range of 30 to 60 degrees from vertical or horizontal. FIG. 15 illustrates the outlet 445 pointing to the side/horizontal and FIG. 16 illustrates the outlet pointing horizontally to the opposite side as that shown in FIG. 16. The outlet 445 may be positioned at any angle along about the rotational axis.

FIGS. 17 and 18 illustrate the rotatable structure of the inflator tool head 400. As shown in FIGS. 17 and 18, the inflator tool head 400 has a fan housing portion 420 that is made as a separate part and is rotatable with respect to the connection portion 410. This is in contrast to the inflator tool heads 200 and 300, in which the connection portion 210 and the fan housing portion 220 are made of a single piece.

As shown in FIGS. 17 and 18, the connection portion 410 has a projection 411 and the fan housing portion 420 has a groove 421. The projection 411 engages with the groove 421 to rotatably connect the fan housing portion 420 and the connection portion 410. As also shown in FIGS. 17 and 18, the fan connection portion 410 has an abutting wall 412 and the fan housing portion has an abutting wall 422. The connection portion abutting wall 412 abuts the housing portion abutting wall 422 providing stability to the connection. In some embodiments, these abutting walls 412, 422 provide friction to maintain the relative rotational location of the fan housing portion 420 to the fan connection portion 410. The user can then rotate the fan housing portion 420 by applying pressure to overcome the friction. In this way, the user can change the angular position of the air outlet 445 among the various rotational locations. The amount of friction can be provided by the dimensioning of the connection and fan housing portions 410 and 420; the materials of the connection and fan housing portions 410 and 420 or the abutting walls 412, 422; surface treatments of the connection and fan housing portions 410 and 420 or the abutting walls 412, 422; other methods for increasing or controlling friction or a combination of the same. For example, the abutting walls 412, 422 may be made to tightly abut one another in order to increase friction. As another example, facing surfaces of the abutting walls 412, 422 may be coated with a high friction material such as rubber in order to increase the friction between the connection housing 410 and fan housing portions 420.

The fan housing portion includes both the air inlet 240 and the air outlet 445. The air inlet 240 is at or on a rotational axis of the fan housing portion 420. Accordingly, although the air inlet 240 of the exemplary embodiment rotates along with the fan housing portion 420, the axis of the air inlet 240 changes none if on the rotational axis or only slightly if slightly off of the rotational axis. Thus, the overall position of the air inlet 240 is relatively the same in all positions of the fan housing portion 420. In other exemplary embodiments, the air inlet 240 may be disposed offset from the rotational axis of the fan housing portion 420 such that the position of the axis of the air inlet 240 also changes when the fan housing portion 420 rotates.

In contrast, the air outlet 445 is at an outer circumference of the fan housing portion 420. Additionally, the air outlet 445 has an axis that is transverse to a rotational axis of the fan housing portion 240. Accordingly, the position of the air outlet 445 changes along with the rotational position of the fan housing portion 240.

The rotational position of the fan housing portion 420 may alternatively or additionally be provided by a biasing assembly. In the exemplary embodiment, there is ball 430 biased by a spring 431 from the connection portion 410 towards the fan housing portion 420. The ball 430 contacts the fan housing portion 420 to maintain the fan housing portion 420 in a rotational location. A user may provide a force to overcome the force provided by the ball 430 to move from the particular rotational location to another rotational location. The fan housing portion 420 may include recesses at particular locations that receive the ball 430. The recesses 435 are located at particular specific locations which may be useful to a user. For example, the recesses 435 may be placed at four locations about the fan housing portion 420, ninety-degrees apart. That would allow the fan housing portion 420 to be specifically set at those four specific and discrete locations, such as up, down, left and right. In other embodiments, there may be eight recesses 435, each forty-five degrees apart. In that instance, four additional locations could be provided between the up, down, left and right positions mentioned above. There may be more or less recesses 435 providing a fewer or greater number of discrete locations for the disposition of the fan housing portion 420 and thus the air outlet 445. There may also be more than one biasing assembly. Additionally, the biasing assembly may be different than a ball biased by a spring. For example, another biasing member may be used instead of a spring and instead of a ball there may be another type of projection or rigid element that engages with the recesses 435. The biasing member and rigid element may also be one piece so that the biasing assembly is a one piece member that serves the same function. For example, this could be a compressible projection.

Accordingly, as shown in FIGS. 12-18, the position of the air outlet 445 is rotatable relative to the handle 12 and is rotatable about a rotation axis. As shown, the rotation axis may be generally concentric or parallel to the longitudinal axis of the motor and generally transverse to the handle 12.

FIGS. 17 and 18 provide cross-sectional views of the inflator head 400 so that internals of the inflator head 400 can be seen. As shown in FIGS. 17 and 18, the inflator head 400 includes a drive connector 70. The drive connector 70 receives rotational motion from the motor. A spindle 75 is driven through the drive connector 70 and is connected to a fan 60. Accordingly, the motor drives the fan 60. Internals of the inflator heads 200 and 300 are the same as that for the inflator head 400 except that the inflator heads 200 and 300 do not include the rotational features of inflator head 400. Accordingly, inflator heads 200 and 300 similarly include drive connector 70, spindle 75 and fan 60. Groove 421, projection 411 and abutting walls 412, 422 and the biasing assembly may be removed in inflator heads 200 and 300. However, one or more of these components may also be maintained in the inflator heads 200, 300 in order to provide rigidity. For example, the structure of abutting walls 412, 422 may be included in the inflator heads 200, 300 in order to provide rigidity for the inflator heads even if they lack a rotation feature. In that case, the abutting walls 412, 422 may be joined or formed as one integral part.

Figure 19:
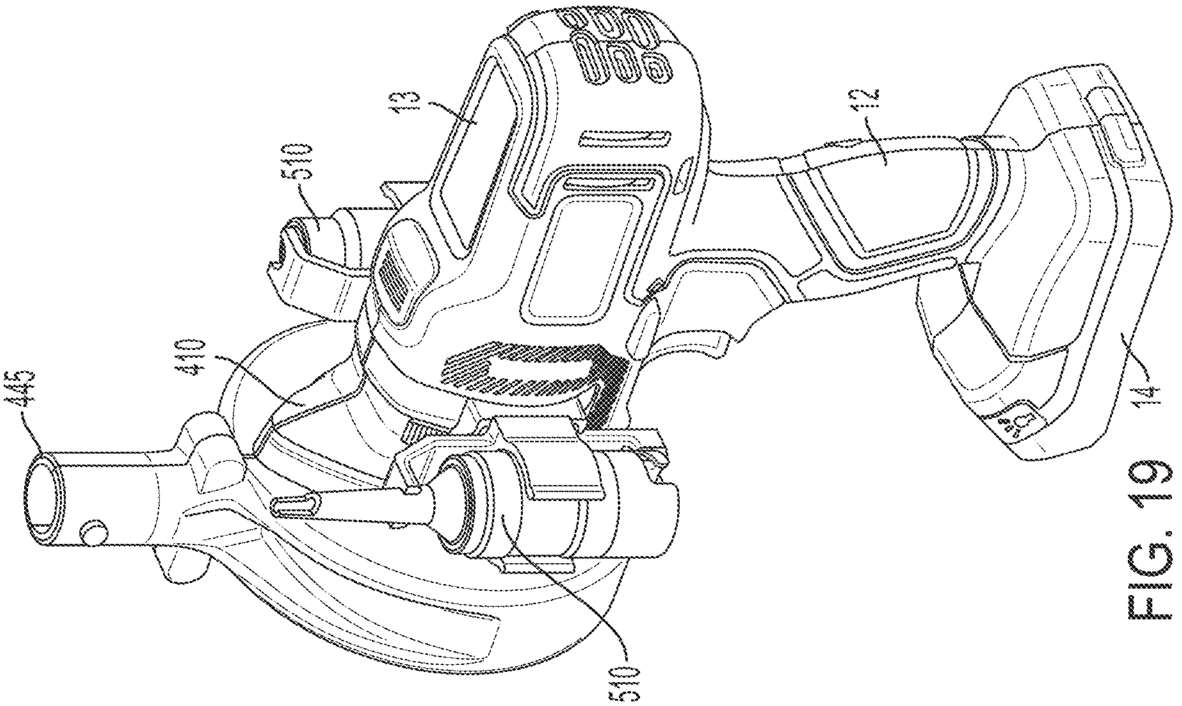
FIG. 19 is a perspective view of the inflator with attachment holders.
Figure 20:
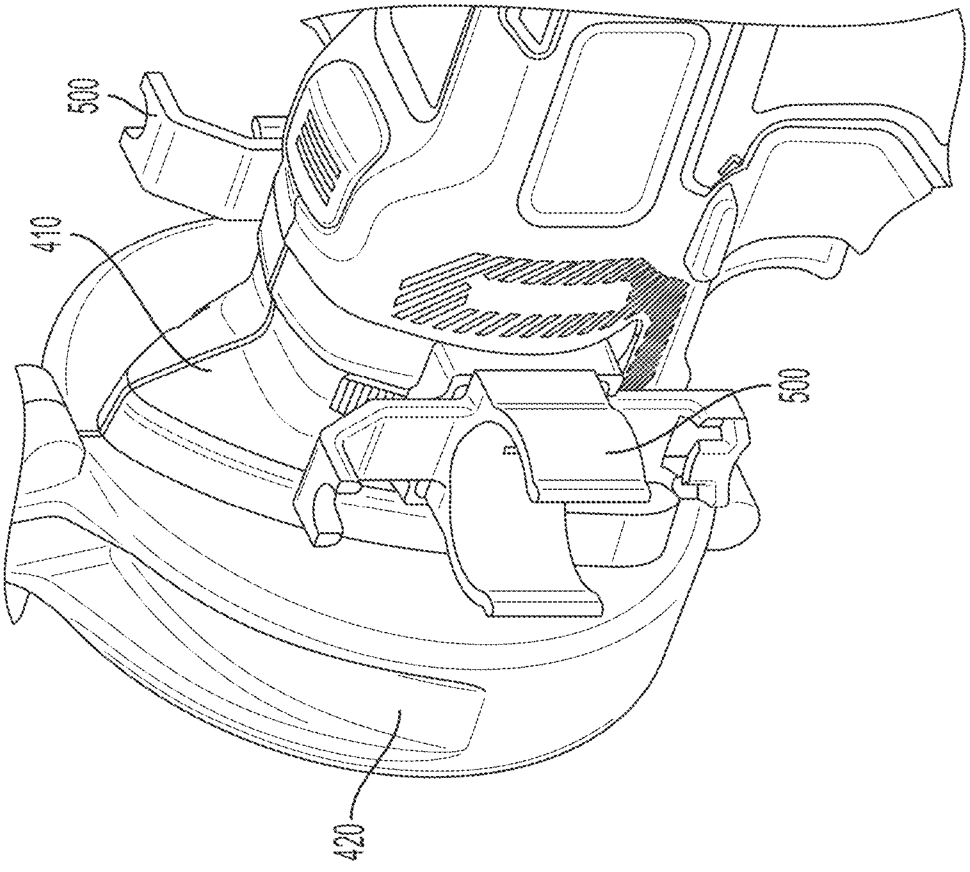
FIG. 20 is a close-up perspective view of the inflator with attachment holders.

FIGS. 19 and 20 illustrate inflator attachment holders 500. The inflator attachment holders 500 are attached to either side of the connection portion 410. The inflator attachment holders 500 hold inflator attachments 510 which can be slid over the air inlet or air outlet so as to interface with various inflatables. FIG. 19 illustrates the attachment holders 500 holding the inflator attachments 510 and FIG. 20 illustrates the attachment holders 500 when empty.

In the exemplary embodiments, the inflators 10, 101 and 102 are formed by a tool base unit and a removable inflator tool head unit. The inflators may also be made as a stand-alone tool where the inflator tool head is integrated with a base unit in a fixed manner rather than being separable.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Additionally, while the exemplary embodiment is described with respect to an inflating tool, the methods and configurations may also apply to or encompass other power tools.

What is claimed is:

1. An inflator, comprising:

a tool base unit, the tool base unit comprising a handle, a motor and a trigger; and an inflator tool head removably attached to the tool base unit;

wherein the inflator tool head comprises an air inlet, an air outlet and a fan configured to draw air in through the air inlet and blow air out through the air outlet;

wherein the inflator tool head comprises a connection portion and a fan housing portion;

wherein the fan is disposed in the fan housing portion; and wherein the fan housing portion is rotatable with respect to the connection portion.

2. The inflator according to claim 1, wherein the fan housing portion includes the air outlet.

3. The inflator according to claim 2, wherein the fan housing portion includes the air inlet.

4. The inflator according to claim 2, wherein the fan housing portion is configured to be held in place in a variety of rotational positions with respect to the connection portion.

5. The inflator according to claim 4, wherein the fan housing portion is configured to be held in place by friction.

6. The inflator according to claim 4, wherein the fan housing portion is configured to be held in place by a biasing assembly.

7. The inflator according to claim 6, wherein the fan housing portion is configured to be held in place at plurality of distinct rotational positions.

8. The inflator according to claim 7, wherein the plurality of distinct rotational positions comprises at least four distinct rotational positions.

9. The inflator according to claim 8, wherein the connection portion houses a connector which receives drive from the motor.

10. A high-volume, low pressure inflator, comprising:

a housing;

a handle formed by the housing;

a motor housed in the housing;

a trigger configured to activate the motor;

an inflator head portion;

an inlet having an inlet axis that is generally parallel or concentric with a longitudinal axis of the motor;

an outlet which is transverse to the inlet;

a fan configured to draw air in through the inlet and blow air out through the outlet;

wherein the inlet is generally transverse to the handle;

wherein the position of the outlet is rotatable relative to the handle;

wherein the inflator head portion comprises a connection portion and a fan housing portion;

wherein the fan is disposed in the fan housing portion; and wherein the fan housing portion includes the outlet and is rotatable with respect to the connection portion.

11. The high-volume, low pressure inflator of claim 10, wherein the outlet is rotatable about a rotation axis;

wherein the rotation axis is generally concentric or parallel to the longitudinal axis of the motor; and wherein the rotation axis is generally transverse to the handle.

* * * * *